(12) United States Patent
Abe

(10) Patent No.: US 8,543,832 B2
(45) Date of Patent: Sep. 24, 2013

(54) SERVICE PROVISION SYSTEM AND COMMUNICATION TERMINAL

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 494 days.

(21) Appl. No.: 12/243,030

(22) Filed: Oct. 1, 2008

(65) Prior Publication Data

US 2009/0100266 A1    Apr. 16, 2009

(30) Foreign Application Priority Data

Oct. 15, 2007    (JP) ................ P2007-268279

(51) Int. Cl.
*H04L 29/06*    (2006.01)

(52) U.S. Cl.
USPC .............................. 713/186; 380/46; 713/165

(58) Field of Classification Search
USPC .......................................... 380/46; 713/175
See application file for complete search history.

(56) References Cited

U.S. PATENT DOCUMENTS 6,918,044 B1 *  7/2005  Robins et al. ................ 726/5
7,177,426 B1 *  2/2007  Dube ............................ 380/46

FOREIGN PATENT DOCUMENTS

| EP | 1777641 A1 * | 4/2007 |
|---|---|---|
| JP | HEI 10-247906 | 9/1998 |
| JP | 2001-144743 | 5/2001 |
| JP | 2002-015257 | 1/2002 |
| JP | 2002-229861 | 8/2002 |
| JP | 2005-064791 | 3/2005 |
| JP | 2006-270697 | 10/2006 |
| JP | 2007-34521 | 2/2007 |

OTHER PUBLICATIONS

Japanese Patent Office Action re 2007-268279 dated Apr. 17, 2012.

* cited by examiner

*Primary Examiner* — Jeffrey Pwu
*Assistant Examiner* — Michael D Anderson
(74) *Attorney, Agent, or Firm* — Finnegan, Henderson, Farabow, Garrett & Dunner, LLP

(57) ABSTRACT

A first memory unit is arranged outside a block that is under security control. The block includes: a second memory unit; an acquisition unit for acquiring biological information on a living body from a captured image of a location of the living body; an encryption unit for encrypting attribute information with an encryption key; a registration unit for registering encrypted attribute information encrypted by the encryption unit into the first memory unit, and registering the biological information and the encryption key into the second memory unit; and a presentation unit for decrypting the encrypted attribute information with the encryption key and presenting the attribute information decrypted to the service provision server if the biological information registered in the second memory unit and biological information acquired by the acquisition unit coincide with each other.

7 Claims, 5 Drawing Sheets

SERVICE PROVISION SYSTEM AND COMMUNICATION TERMINAL

CROSS REFERENCES TO RELATED APPLICATIONS

The present invention contains subject matter related to Japanese Patent Application JP2007-268279 filed in the Japanese Patent Office on Oct. 15, 2007, the entire contents of which being incorporated herein by reference.

BACKGROUND OF THE INVENTION

1. Field of the Invention

The present invention relates to a service provision system and a communication terminal, and is suitably applicable, for example, to the case of providing services over the Internet.

2. Description of the Related Art

The use of living bodies for authentication purposes has become increasingly prevalent. Biological authentication apparatuses mounted on portable communication devices such as a cellular phone facilitate providing authentication processing and the like to communication partners anywhere through the portable communication devices. Under the circumstances, it is becoming increasingly important for portable communication devices to incorporate biological authentication apparatuses. There have been proposed credit cards and cash cards that incorporate a biological authentication apparatus (for example, see Jpn. Pat. Appln. Laid-Open Publication No. 2007-34521).

SUMMARY OF THE INVENTION

When providing services over the Internet, a service provision server sets up user accounts, passwords, the content of users' access privileges over the services, and the like, and manages the services by user. The greater the number of service users, the higher the load of service management on the service provision server, which can lead to a breakdown of the service provision server.

The load of service management on the service provision server can be reduced if the user information is managed by each individual terminal to receive the services, instead of the service provision server managing it in a centralized fashion.

Here, if a terminal simply stores a user account and a password into a memory unit inside, a third party might use the user account and the password to receive services, pretending to be an authorized user, i.e., spoofing. There is therefore a need to control third-party access to the user account and the password.

Instead of the user account and the password, information pertaining to a living body (biological information) such as a fingerprint and veins can be applied to avoid spoofing since the subject of the authentication is the information separate from the terminal. Since biological information is said to be invariable throughout one's lifetime and has such properties as being unable to modify as needed, third-party access thereto needs to be controlled more severely than to passwords which can be selected arbitrarily.

For this reason, confidential information such as user accounts, passwords, and biological information is often stored in a module that has a higher security level than other information is, like a module that has tamper resistance. Memories having a high security level are difficult to increase in capacity, however, and areas available for the confidential information tend to be small.

Even when biological information dealing only with characteristic portions of a living body is retained (in a compressed state), the amount of memory use inside the module would increase to saturation if attribute information such as user's access privileges is also retained along with the biological information.

The present invention has been made in view of the foregoing. It is thus a general purpose of the invention to propose a service provision system and a communication terminal which can manage attribute information securely while suppressing the amount of memory use inside a block that is securely controlled.

To solve the foregoing problems, a service provision system according to an aspect of the present invention includes a service provision server and a communication terminal capable of communicating with the service provision server over a network. The communication terminal has a first memory unit arranged outside a block that is under security control. The block includes: a second memory unit; an acquisition unit for acquiring biological information on a living body from a captured image of a location of the living body; an encryption unit for encrypting user's attribute information on a service of the service provision server with an encryption key; a registration unit for registering encrypted attribute information encrypted by the encryption unit into the first memory unit, and registering the biological information and the encryption key into the second memory unit; and a decryption unit for decrypting the encrypted attribute information with the encryption key if the biological information registered in the second memory unit and biological information acquired by the acquisition unit coincide with each other. The service provision server includes a provision processing unit for executing processing for providing its own service based on the attribute information decrypted by the decryption unit.

A communication terminal according to another aspect of the present invention is capable of communicating with a service provision server over a network, and has a first memory unit arranged outside a block that is under security control. The block includes: a second memory unit; an acquisition unit for acquiring biological information on a living body from a captured image of a location of the living body; an encryption unit for encrypting attribute information with an encryption key; a registration unit for registering encrypted attribute information encrypted by the encryption unit into the first memory unit, and registering the biological information and the encryption key into the second memory unit; and a presentation unit for decrypting the encrypted attribute information with the encryption key and presenting the attribute information decrypted to the service provision server if the biological information registered in the second memory unit and biological information acquired by the acquisition unit coincide with each other.

As described above, according to the present invention, the attribute information is encrypted inside the block which has a higher security level, and is registered in this state into the first memory unit outside the block. The encryption key for encrypting the attribute information is registered into the second memory unit inside the block of higher security level. This makes it possible to prevent the encryption key and the encryption algorithm from being stolen or decoded by a third party. The amount of use of the second memory unit can also be reduced as compared to when both the attribute information and the encryption key are registered in the second memory unit.

In addition, biological information that only the user himself/herself has is retained in the second memory unit inside the block of higher security level as the key for decrypting the encrypted attribute information. Since the attribute information is concealed in two levels with the keys of different perspectives, it is possible with even higher reliability to prevent the encryption key and the encryption algorithm from being stolen or decoded by a third party.

As described above, the attribute information is concealed in two levels inside the block of higher security level and is registered in this state into the first memory unit outside the block, while the encryption key and the vein information to be concealed are retained inside the block. This makes it possible to achieve a service provision system and a communication terminal which can manage the attribute information securely while suppressing the amount of memory use inside the block that is securely controlled.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, an embodiment to which the present invention is applied will be described in detail with reference to the drawings.

(1) Configuration of Service Provision System

Figure 1:
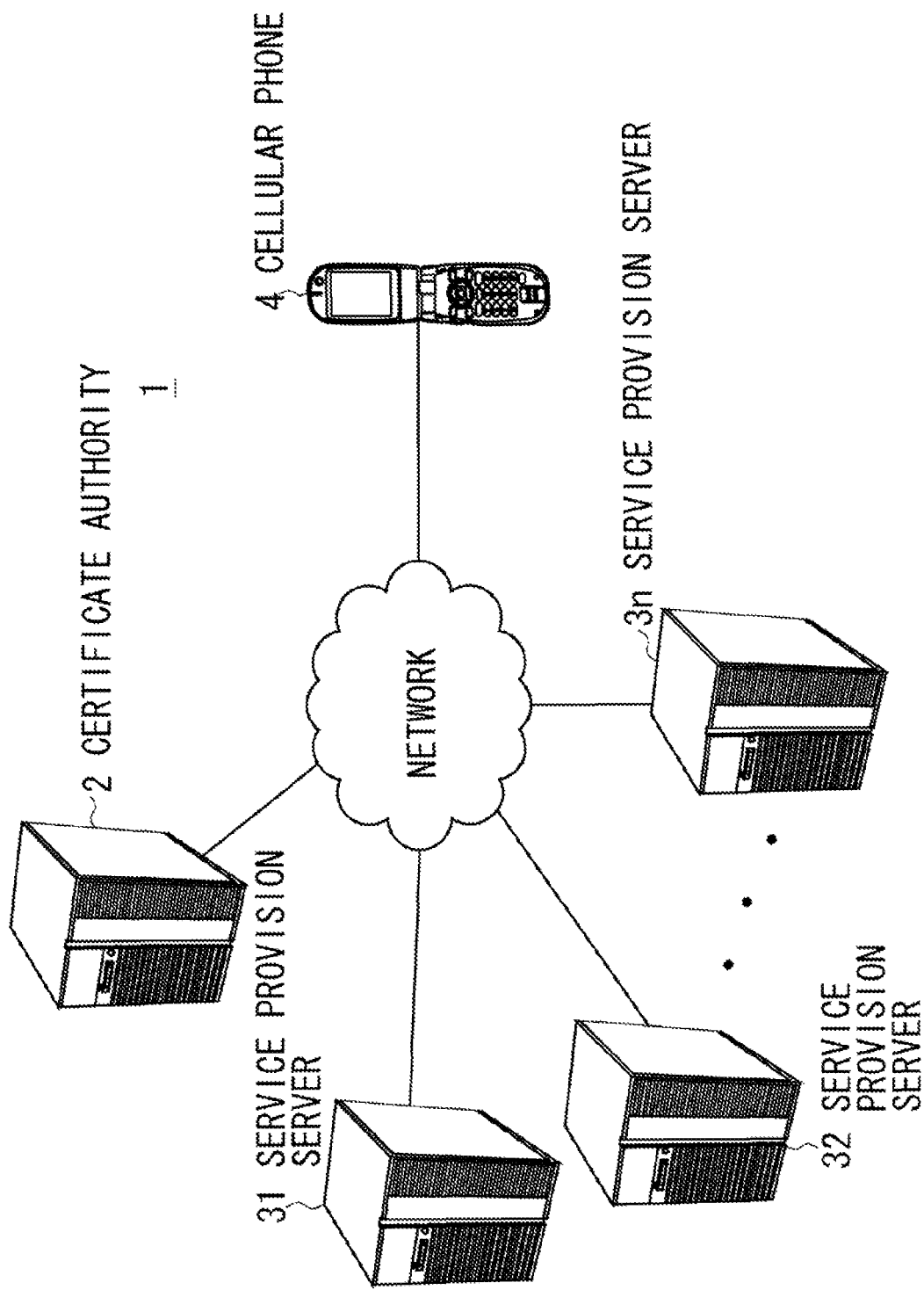
FIG. 1 is a schematic diagram showing the configuration of a communication system according to an embodiment.

FIG. 1 shows the overall configuration of a service provision system 1 according to the present embodiment. This service provision system 1 includes a certificate authority (CA) 2, a plurality of service provision servers $3_1, 3_2, \ldots, 3_n$, and a cellular phone 4, which are connected over a network 5 such as the Internet or a Next Generation Network (NGN).

The certificate authority 2 is a server for authenticating user identification, and issues a public key certificate (PKC) to a request source which makes a request over the network 5.

This public key certificate is generated by using a public key infrastructure (PKI). The public key certificate includes a user identification (ID) such as a username, MAC address, and mail address, a public key corresponding to the user ID, and a digital signature attached thereto. The digital signature is generated by encrypting fixed length data, such as a hash value derived from the user ID and the public key by using a one-way function, with a secret key for signature.

The service provision servers $3_1, 3_2, \ldots, 3_n$ are servers for providing predetermined services over the network 5. The service provision servers $3_1, 3_2, \ldots, 3_n$ provide their own services to a service receiver over the network 5 using user attribute information such as the access privileges of the user over the services.

Each of the service provision servers $3_1, 3_2, \ldots, 3_n$ also functions as a server for certifying the attributes of the user such as an access privilege, and issues an attribute certificate (AC) to the service receiver.

This attribute certificate is generated by using a privilege management infrastructure (PMI). The attribute certificate includes the user ID of the service receiver, user attribute information on the service receiver relating to the own service, and a digital signature attached thereto. The digital signature is generated by encrypting fixed length data derived from the user ID and the user attribute information by using a one-way function, with a secret key for signature.

The cellular phone 4 is a terminal unit capable of communicating with the service provision servers $3_x$ ($3_1, 3_2, \ldots,$ or $3_n$) over the network. The cellular phone 4 receives services from the service provision servers $3_x$ over the network.

(2) Configuration of Cellular Phone

Next, the configuration of the cellular phone 4 will be described with reference to FIG. 2. This cellular phone 4 includes an operation unit 11, a security chip 12, an image pickup unit 13, a memory unit 14, a communication unit 15, a display unit 16, and a voice output unit 17 which are each connected to a control unit 10 through a bus 18.

The control unit 10 is configured as a computer which includes a main central processing unit (CPU) for governing the control of the entire cellular phone 4, a read only memory (ROM), and a random access memory (RAM) as a work memory of the main CPU.

Based on programs corresponding to commands that are given from the operation unit 11, this control unit 10 controls the image pickup unit 13, the memory unit 14, the communication unit 15, the display unit 16, and the voice output unit 17 appropriately to perform various types of processing corresponding to the commands, such as download processing, server access processing, call processing, speech processing, mail creation processing, and mail transfer processing.

The security chip 12 is packaged to include a sub CPU for governing the control of this security chip 12, a RAM and a memory unit (hereinafter, referred to as security memory unit) as work memories of this sub CPU.

This security chip 12 has tamper resistant capabilities such as the function of protecting the memory unit from unauthorized accesses and the function of erasing data in the memory unit in response to unauthorized accesses. The security chip 12 is thus controlled with a security level higher than that of the memory unit 14.

This control unit 12 also controls the image pickup unit 13, the communication unit 15, the display unit 16, and the voice output unit 17 appropriately based on programs corresponding to a mode in which a vein pattern of the user to be registered (hereinafter, referred to as registrant) is registered (hereinafter, referred to as vein registration mode) or a mode in which the presence or absence of the registrant his/herself is determined (hereinafter, referred to as authentication mode). The control unit 12 thereby executes registration processing or authentication processing.

The image pickup unit 13 generates and acquires an image of a subject lying in its image pickup range as image data, and transmits the acquired image data to the control unit 10.

When in the vein registration mode or in the authentication mode, the image pickup unit 13 irradiates a light input surface for a finger to be placed on, with light that has a wavelength within a wavelength band (700 nm to 900 nm) that has the characteristic of being specifically absorbable to both deoxygenated hemoglobin and oxygenated hemoglobin (hereinafter, referred to as near-infrared light). The image pickup unit 13 generates an image of veins in the biological location placed on the light input surface (hereinafter, referred to as vein image) in the form of data (hereinafter, referred to as vein image data), and transmits it to the control unit 10.

The memory unit 14 stores various information other than vein information which is extracted from vein image data. The memory unit 14 stores the information into a predetermined area specified by the control unit 10, or reads it from a predetermined area.

The communication unit 15 transmits and receives signals to and from the network 5 (FIG. 1). Specifically, the communication unit 15 modulates input data to be communicated by using a predetermined modulation method such as orthogonal frequency division multiplex (OFDM), and transmits the resulting modulated signal to a base station through an antenna (not shown). In the meantime, the communication unit 15 demodulates signals received through the antenna by a predetermined demodulation method, and outputs the resulting demodulated data.

The display unit 16 displays characters and graphics on a display screen based on display data supplied from the control unit 10. The voice output unit 17 makes a voice output from a speaker based on voice data supplied from the control unit 10.

(3) Service Reception Processing

Next, service reception processing of the cellular phone 4 will be described separately for the case of registering user attribute information and for the case of receiving a service from a service provision server $3_x$ by using the user attribute information.

(3-1) When Registering User Attribute Information

Figure 3:
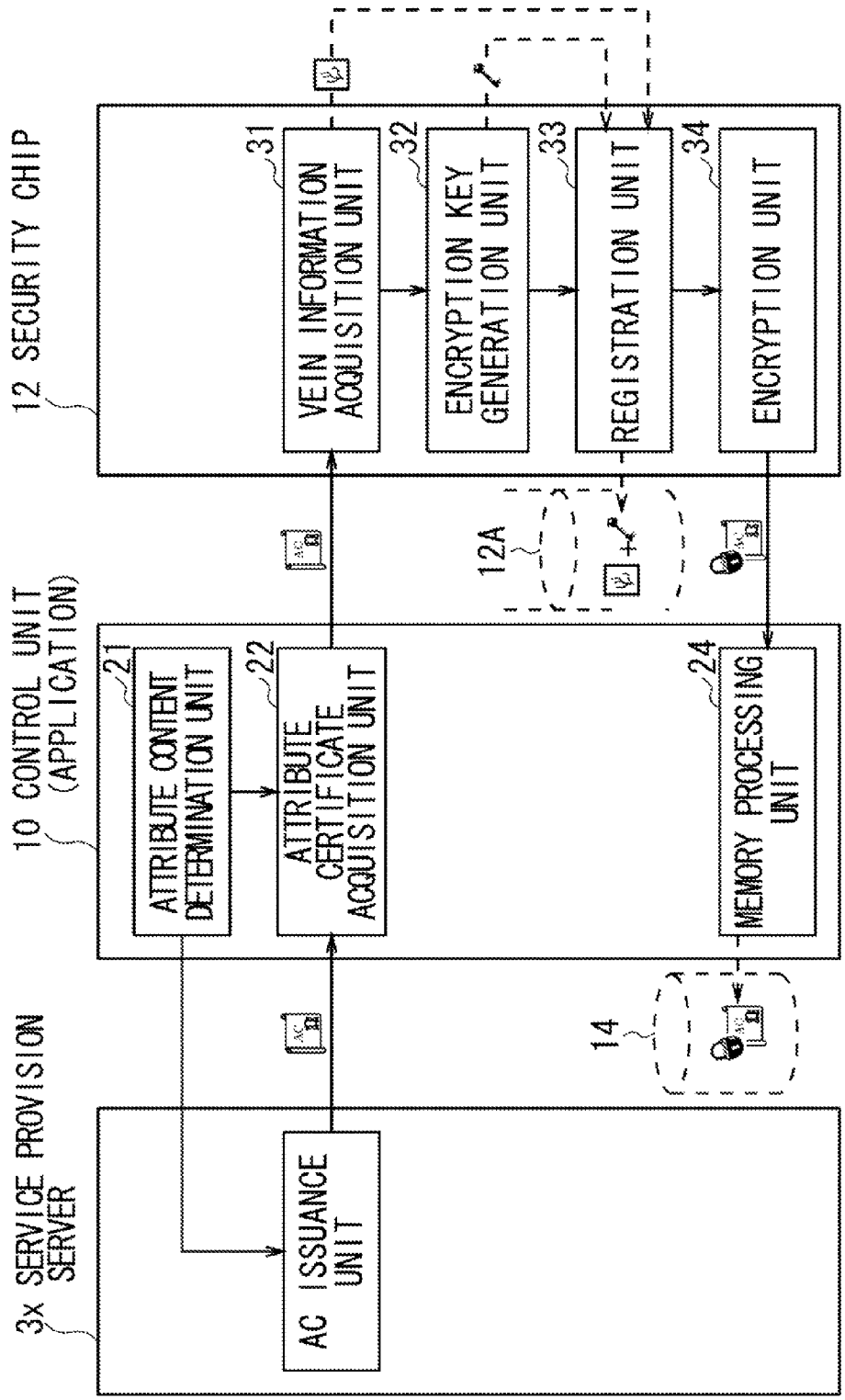
FIG. 3 is a diagram showing a registration sequence in service reception processing.

In this case, the control unit 10 acquires application software pertaining to the provision of a service from the service provision server $3_x$ through the communication unit 15, and stores it into the memory unit 14. Using this application software, as shown in FIG. 3, the control unit 10 functions as an attribute content determination unit 21, an attribute certificate acquisition unit 22, and a memory processing unit 23.

The attribute content determination unit 21 displays an input screen for inputting user attribute information onto the display unit 16 with a graphical user interface (GUI), based on the type of the service and the content of the service, such as description, of the service provision server $3_x$.

When the input to the input screen is ended, the attribute content determination unit 21 establishes a dedicated communication channel with the service provision server $3_x$, using a Secure Sockets Layer protocol (SSL) or the like. Through this dedicated communication channel, the attribute content determination unit 21 supplies user attribute information and makes a request to issue an attribute certificate.

Receiving the request to issue an attribute certificate, an AC issuance unit of the service provision server $3_x$ requests the public key certificate of the cellular phone 4 from the certificate authority 2. The digital signature on the public key certificate of the cellular phone 4, issued from the certificate authority 2, is decrypted with the public key of the certificate authority 2.

The AC issuance unit then collates the result of this decryption with fixed length data that is derived from the main body of the public key certificate (the user ID of the cellular phone 4 and the public key associated with the user ID), thereby verifying the digital signature. If this collation results in coincidence, the service receiver (the user of the cellular phone 4) is authenticated. In this case, the AC issuance unit generates and issues an attribute certificate with the user ID of the cellular phone 4 and the user attribute information supplied from the attribute content determination unit 21 as the main body.

Acquiring the attribute certificate from the service provision server $3_x$ through the dedicated communication channel, the attribute certificate acquisition unit 22 supplies this attribute certificate to the security chip 12, and requests the security chip 12 to manage the attribute certificate.

Receiving the request to manage the attribute certificate from the attribute certificate acquisition unit 22, the security chip 12 functions as a vein information acquisition unit 31, an encryption key generation unit 32, a registration unit 33, and an encryption unit 34 by using programs corresponding to the vein registration mode.

Figure 2:
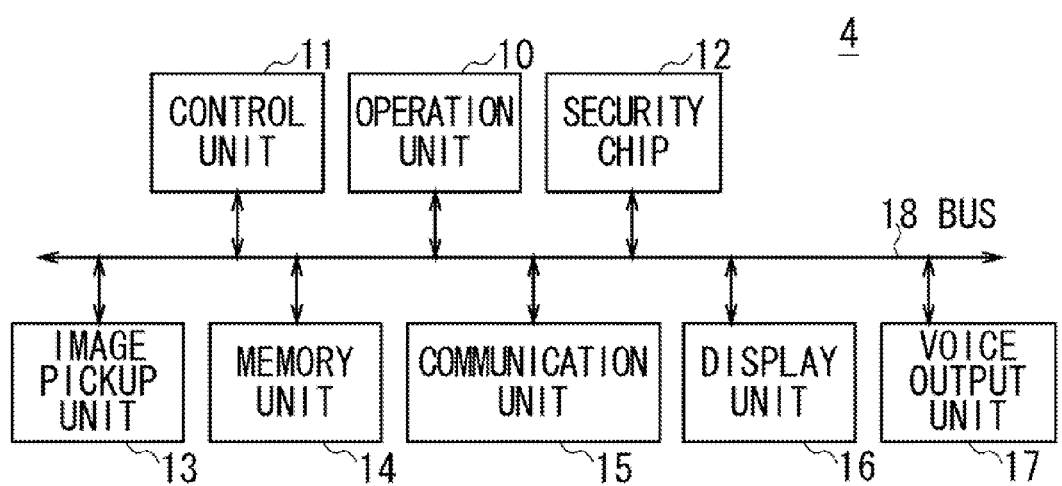
FIG. 2 is a block diagram showing the configuration of a cellular phone.

The vein information acquisition unit 31 makes a notification to place a finger on the light input surface, through at least either one of the display unit 16 (FIG. 2) and the voice output unit 17 (FIG. 2). The vein information acquisition unit 31 then sets an optimum vein-imaging condition for the image pickup unit 13.

Specifically, the vein information acquisition unit 31 drives a light source which is intended to irradiate behind a vein layer in the finger that is put on the light input surface. When the back of the vein layer in the finger is irradiated with near-infrared light, the near-infrared light is reflected and scattered inside the finger to pass through the vein layer and an epidermal layer and enter the light input surface. This near-infrared light incident on the light input surface is brighter in non-vein areas inside the finger, and remains dark in vein areas due to the light absorption characteristic of hemoglobin, thereby providing a sharp contrast between the vein areas and the non-vein areas. The near-infrared light is guided to the image pickup surface of the image pickup unit 13 as light that projects veins (hereinafter, referred to as vein projection light).

Based on vein image data output from the image pickup unit 13, the vein information acquisition unit 31 adjusts the lens position of the optical lens, for example, so as to focus on veins. The vein information acquisition unit 31 also adjusts both the aperture value of the diaphragm and the shutter speed (exposure time) to the image pickup device with respect to a predetermined exposure value (EV), thereby setting an optimum vein-imaging condition for the image pickup unit 13.

Setting the optimum vein-imaging condition for the image pickup unit 13, the vein information acquisition unit 31 applies preprocessing to the vein image data output from the image pickup unit 13, and extracts vein information from the resultant image of the preprocessing. Various types of information may be employed for this vein information, including a vein image having the centers of vessel widths or intensity peaks extracted, all or some of the centers of the vessel widths or the intensity peaks, and parameters for curve approximation of the veins.

In one of the examples of the specific methods for the preprocessing, the outlines of veins in the vein image are highlighted by using a differential filter such as a Laplacian of Gaussian (Log) filter. The image with the highlighted outlines is converted into a binary image on the basis of a set brightness value.

The encryption key generation unit 32 generates an encryption key unique to the attribute certificate supplied from the attribute certificate acquisition unit 22. For example, this generation method uses a pseudo-random number which is derived from all or part of the vein information or all or part of the attribute certificate.

The registration unit 33 stores, and thereby registers, the vein information acquired by the vein information acquisition unit 31 and the encryption key generated by the encryption key generation unit 32 in association with each other into the security memory unit 12A inside the security chip 12 which is managed with a security level higher than that of the memory unit 14 of the cellular phone 4.

The encryption unit 34 encrypts the attribute certificate, for example, by an encryption method called advanced encryption standard (AES), using the encryption key generated by the encryption key generation unit 32. The encryption unit 34 also supplies the attribute certificate encrypted (hereinafter, referred to as encrypted attribute certificate) to the memory processing unit 24, and requests the memory processing unit 24 to store this encrypted attribute certificate. The encrypted attribute certificate is thus stored into the memory unit 14 for registration.

As described above, when registering the condition for receiving the service from the service provision server $3_x$, this cellular phone 4 encrypts the attribute certificate which is issued from the service provision server $3_x$ based on user attribute information input by the user, with an encryption key unique to the attribute certificate, and stores it into the memory unit 14. The encryption key is associated with the vein information, and is registered into the security memory unit 12A inside the security chip 12 which has a security level higher than that of the memory unit 14.

(3-2) When Receiving Service

Figure 4:
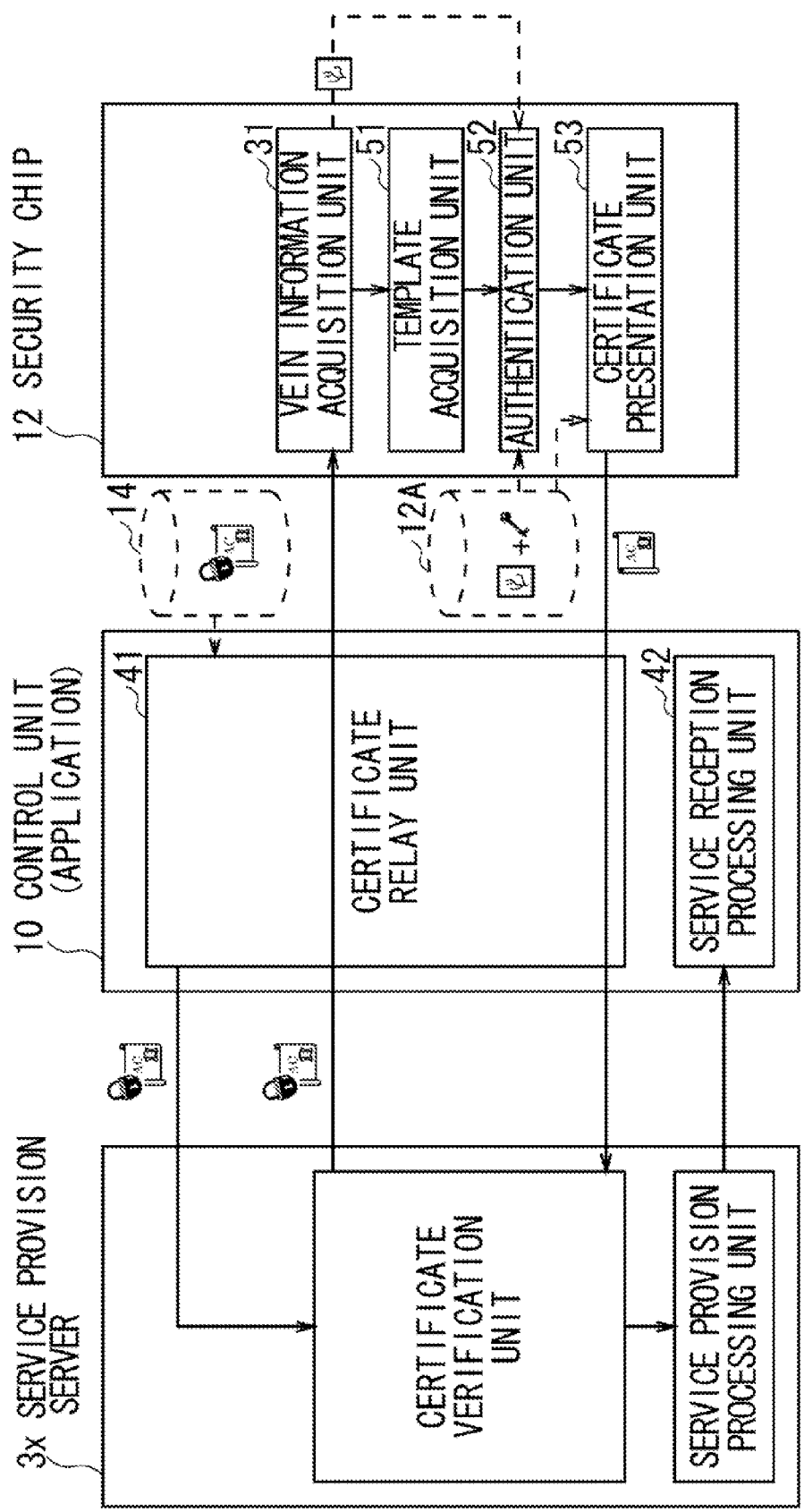
FIG. 4 is a diagram showing a reception sequence (1) in the service reception processing.

In this case, as shown in FIG. 4 where corresponding parts to those of FIG. 3 are designated by like reference numerals, the control unit 10 functions as a certificate relay unit 41 and a service reception processing unit 42, using application software pertaining to the provision of the service.

The certificate relay unit 41 searches the memory unit 14 for an encrypted attribute certificate corresponding to the service of the service provision server $3_x$. The certificate relay unit 41 establishes a dedicated communication channel to the service provision server $3_x$. Through the dedicated communication channel, the certificate relay unit 41 supplies the encrypted attribute certificate to the service provision server $3_x$ and requests it to start providing the service.

A certificate verification unit of the service provision server $3_x$ determines whether the encrypted attribute certificate is encrypted or not. If the attribute certificate is determined to be encrypted, the certificate verification unit returns the encrypted attribute certificate through the dedicated communication channel, and requests to decrypt the encrypted attribute certificate. Incidentally, if the attribute certificate is determined not to be encrypted, the digital signature on the attribute certificate is subjected to verification.

Receiving the request to decrypt the encrypted attribute certificate, the certificate relay unit 41 supplies the encrypted attribute certificate to the security chip 12 along with the decryption request.

Receiving the request to decrypt the encrypted attribute certificate, the security chip 12 functions as the vein information acquisition unit 31, a template acquisition unit 51, an authentication unit 52, and a certificate presentation unit 53 by using programs corresponding to the authentication mode.

The template acquisition unit 51 searches the security memory unit 12A for vein information to be registered, corresponding to the service of the service provision server $3_x$, and reads the searched vein information.

The authentication unit 52 collates vein formation to be authenticated which is acquired from the user by the vein information acquisition unit 31, and the vein information to be registered which is read by the template acquisition unit 51. For example, a cross-correlation function, a phase correlation function, or a sum-of-absolution-difference (SAD) is used for this collation method.

If the result of collation reaches or exceeds a reference level, the authentication unit 52 determines that the pieces of vein information collated coincide with each other, that the authentication succeeded. If the result of collation falls below the reference level, on the other hand, the authentication unit 52 determines that the pieces of vein information collated do not coincide with each other, that the authentication failed.

If the authentication unit 52 determines that the authentication succeeded, the certificate presentation unit 53 reads from the security memory unit 12A the encryption key that is associated with the piece of vein information to be registered at the time of the determination. Using this encryption key, the certificate presentation unit 53 decrypts the encrypted attribute certificate that is supplied from the service provision server $3_x$ through the dedicated communication channel of the certificate relay unit 41.

The certificate presentation unit 53 returns the attribute certificate resulting from this decryption to the service provision server $3_x$ through the dedicated communication channel of the certificate relay unit 41.

Receiving this attribute certificate, the certificate verification unit of the service provision server $3_x$ decrypts the digital signature on this attribute certificate with the public key for signature. The certificate verification unit collates the result of this decryption with fixed length data that is derived from the main body of the attribute certificate (user information including the user ID of the cellular phone 4 and the user attribute information associated with the user ID), thereby verifying the digital signature.

If this collation results in coincidence, the identity of the user ID and the content of the user attribute information are determined to be authentic. In this case, a service provision processing unit provides its own service by using the user attribute information in response to the request from the cellular phone 4.

The service reception processing unit 42 and the service provision processing unit perform various types of processing for receiving the service from the service provision processing unit, whereby the service of the service provision server is received.

As described above, when this cellular phone 4 receives the service from the service provision server $3_x$, it decrypts the encrypted attribute information stored in the memory unit 14 outside the security chip 12, with the encryption key that is associated with vein information registered in the security memory unit 12A inside the security chip 12 only if vein information coincident with the registered vein information is input. The attribute certificate resulting from this decryption is presented to the service provision server $3_x$.

(4) Concrete Examples of Service Reception Processing

Next, concrete examples of the service reception processing of the cellular phone 4 will be described separately for cases where the service provision server $3_x$ is a server for providing banking transactions such as an account review and an exchange transaction (hereinafter, referred to as bank server), and where it is a server for providing audio, video, game software, or other contents (hereinafter, referred to as content provision server).

(4-1) When Receiving Service from Bank Server (4-1-1) When Registering User Attribute Information In this case, the attribute content determination unit 21 (FIG. 3) displays a GUI input screen on the display unit 16 for inputting items including name, address, date of birth, and gender. The attribute content determination unit 21 supplies the entries for the respective items to the bank server as user attribute information, and requests the bank server to issue an attribute certificate.

If the service receiver (the user of the cellular phone 4) is properly identified, the AC issuance unit of the bank server adds an account number, which is assigned by the bank server, to the user attribute information supplied from the attribute content determination unit 21. The AC issuance unit then notifies the account number to the cellular phone 4, and issues the attribute certificate with the user ID of the cellular phone 4 and the user attribute information including the account number as the main body.

Acquiring the attribute certificate from the bank server through the dedicated communication channel, the attribute certificate acquisition unit 22 supplies this attribute certificate to the security chip 12, and requests the security chip 12 to manage the attribute certificate.

As described above, the security chip 12 encrypts the attribute certificate with the encryption key unique to the attribute certificate, and stores it into the memory unit 14. The security chip 12 associates the encryption key with vein information, and registers them into the security memory unit 12A inside the security chip 12 which has a security level higher than that of the memory unit 14.

(4-1-2) When Receiving Service

In this case, the security chip 12 (FIG. 4), as described above, decrypts the encrypted a tribute information stored in the memory unit 14 outside the security chip 12, with the encryption key that is associated with vein information registered in the security memory unit 12A inside the security chip 12 only if vein information coincident with the vein information registered is input. The attribute certificate resulting from this decryption is presented to the bank server through the dedicated communication channel.

If the identity of the user ID and the content of the user attribute information are determined to be authentic based on the attribute certificate, the service provision processing unit of the bank server requests the cellular phone 4 to select a desired service to receive, through the dedicated communication channel.

Receiving the request to select a desired service to receive, the service reception processing unit 42 displays a GUI screen on the display 16 for selecting and determining a desired service, for example, from balance inquiry, transaction inquiry, direct deposit, account transfer, financial products (time deposit, foreign currency savings, trust fund, etc.), lottery purchase, and PayPal. The service reception processing unit 42 notifies the content of the service selected and determined to the bank server through the dedicated communication channel.

When the service content is notified, the service provision processing unit of the bank server executes the processing corresponding to the notified service content based on the account number included in the user attribute information, and notifies the result of the processing to the service reception processing unit 42 through the dedicated communication channel.

As described above, when the service provision server $3_x$ is a bank server, the bank server generates an attribute certificate by adding, in the content provision server, an authenticated user ID and an identifier for detecting tampering with user attribute information and the user ID to the user attribute information which includes the user entries and the account number assigned by the bank server. The cellular phone 4 then encrypts the attribute certificate by using the security chip 12, and registers it into the memory unit 14 outside the security chip 12.

(4-2) When Receiving Service from Content Provision Server (4-2-1) When Registering User Attribute Information In this case, the attribute content determination unit 21 (FIG. 3) displays a GUI input screen on the display unit 16 for inputting items including name, address, date of birth, gender, desired contents to receive, and a use privilege thereon.

The desired contents to receive include a plurality of items. For example, game contents, video contents, music contents, and still image contents to be provided by the content provision server are selectably input to respective items category by category. The use privilege includes items as many as the number of items of the contents desired to receive. In this embodiment, either the available period or the available number of times of use is selectably input to the items depending on the contents selected in the respective items of the contents desired to receive. Incidentally, the use privilege may be switched from the available period to the available number of times of use, or from the available number of times of use to the available period.

When the items are input, the attribute content determination unit 21 supplies the entries in the respective items to the content provision server as user attribute information, and requests the content provision server to issue an attribute certificate.

If the service receiver (the user of the cellular phone 4) is properly identified, the AC issuance unit of the content provision server issues an attribute certificate to the cellular phone 4 through the dedicated communication channel, the attribute certificate including the user ID of the cellular phone 4 and the user attribute information as the main body.

Acquiring the attribute certificate from the content provision server through the dedicated communication channel, the attribute certificate acquisition unit 22 (FIG. 3) supplies this attribute certificate to the security chip 12, and requests the security chip 12 to manage the attribute certificate.

As described above, the security chip 12 (FIG. 3) encrypts the attribute certificate with the encryption key unique to the attribute certificate, and stores it into the memory unit 14. The security chip 12 associates the encryption key with vein information, and registers them into the security memory unit 12A inside the security chip 12 which has a security level higher than that of the memory unit 14.

(4-2-2) When Receiving Service

In this case, the security chip 12 (FIG. 4), as described above, decrypts the encrypted attribute information stored in the memory unit 14 outside the security chip 12, with the encryption key that is associated with vein information registered in the security memory unit 12A inside the security chip 12 only if vein information coincident with the vein information registered is input. The attribute certificate resulting from this decryption is presented to the content provision server through the dedicated communication channel.

If the identity of the user ID and the content of the user attribute information are determined to be authentic based on the attribute certificate, the service provision processing unit of the content provision server supplies the contents desired to receive, specified in the user attribute information, to the service reception processing unit 42 of the cellular phone 4 through the dedicated communication channel depending on the use privilege included in the user attribute information.

Specifically, when the use privilege is defined in terms of available period, the service provision processing unit determines if there is any available period left. If the available period still has a remaining time, the desired contents to receive, specified by the user attribute information, are provided to the service reception processing unit 42 through the dedicated communication channel.

When the use privilege is defined in terms of the available number of times of use, on the other hand, the service provision processing unit determines if there is any available number of times of use left. If the available number of times of use still has a remaining count, the contents desired to receive, specified by the user attribute information, are supplied through the dedicated communication channel. After the provision, the available number of times of use is decremented by one in the user attribute information. Since the available number of times of use is modified in the user attribute information, the service provision processing unit issues an attribute certificate again with the user ID of the cellular phone 4 and the modified user attribute information as the main body. The service provision processing unit supplies the attribute certificate reissued to the service reception processing unit 42, and notifies the service reception processing unit 42 that the user attribute information is modified.

Figure 5:
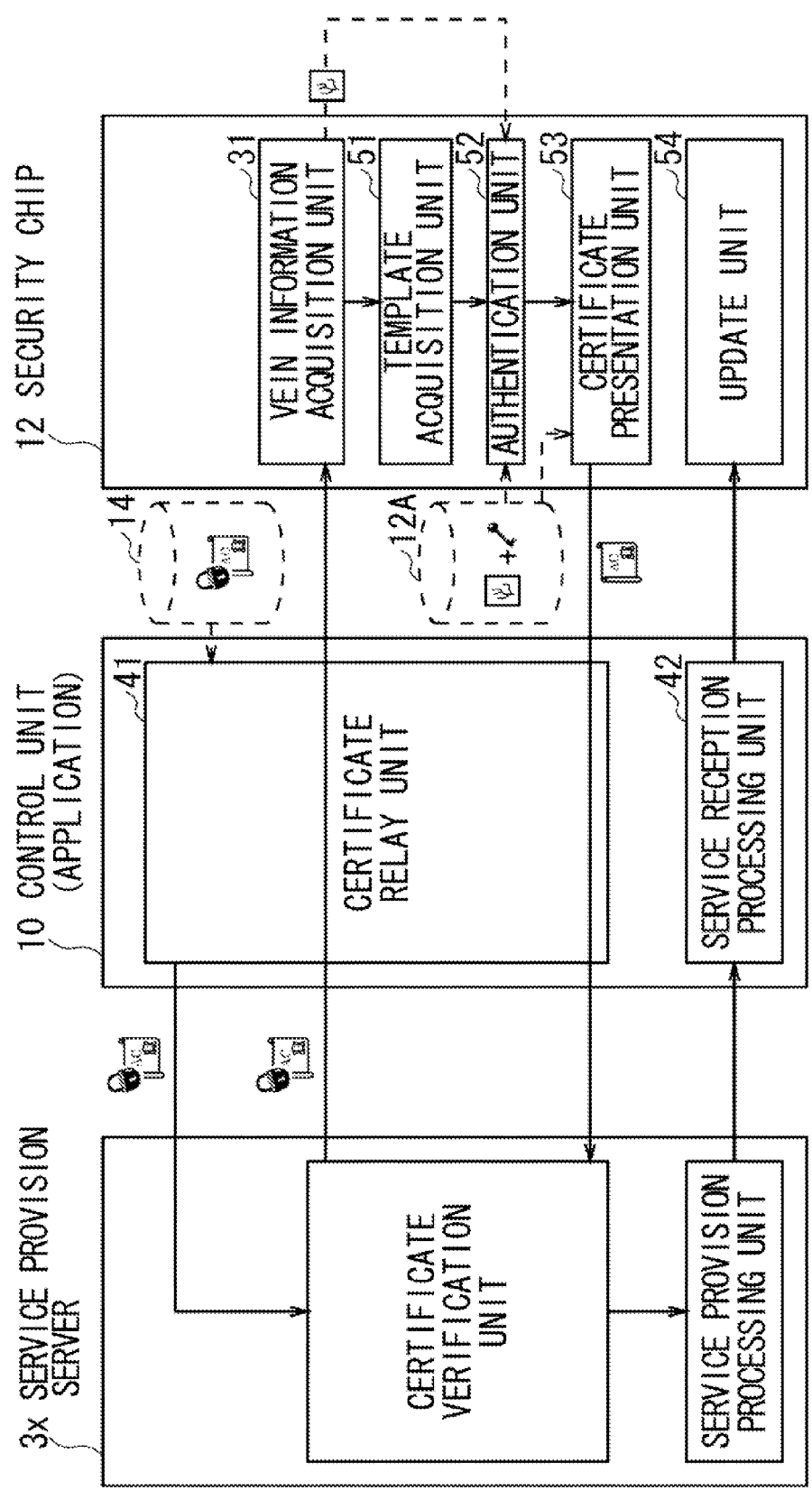
FIG. 5 is a diagram showing a reception sequence (2) in the service reception processing.

As shown in FIG. 5 where corresponding parts to those of FIG. 4 are designated by like reference numerals, when the user attribute information is modified, the service reception processing unit 42 supplies the attribute certificate reissued to the security chip 12, and requests the security chip 12 to update the attribute certificate.

In this case, an update unit 54 of the security chip 12 generates an encryption key unique to the reissued attribute certificate by using the encryption key generation unit 32 (FIG. 3). The update unit 54 also uses the registration unit 33 (FIG. 3) to overwrite the encryption key that is generated for the attribute certificate yet to be reissued, with the encryption key that is generated for the attribute certificate reissued, thereby updating the association of the encryption key with the vein information.

The update unit 54 encrypts the reissued attribute certificate with the encryption key unique to the reissued attribute certificate by using the encryption unit 34 (FIG. 3). The update unit 54 overwrites the encrypted attribute certificate that is encrypted from the attribute certificate yet to be reissued, with the encrypted attribute certificate that is encrypted from the attribute certificate reissued, thereby updating the registration of the encrypted attribute certificate in the memory unit 14.

As described above, when the service provision server $3_x$ is a content provision server, the service provision server generates an attribute certificate by adding an authenticated user ID and an identifier for detecting tampering with user attribute information and the user ID to the user attribute information which includes the content of user attributes, the desired contents to receive, and the use privilege over the contents. The cellular phone 4 then encrypts the attribute certificate by using the security chip 12, and registers it into the memory unit 14 outside the security chip 12.

When the use privilege is modified, the cellular phone 4 updates the association of the encryption key with the vein information, and updates the registration of the encrypted attribute certificate in the memory unit 14.

(5) Operation and Effect

In the foregoing configuration, this cellular phone 4 acquires vein information from a vein image and encrypts user attribute information with an encryption key in the security chip 12 that is under security control (FIG. 3).

The cellular phone 4 then registers the encryption key and the vein information into the security memory unit 12A inside the security chip 12, and registers the encrypted user attribute information into the memory unit 14 outside the security chip 12 (FIG. 3).

That is, the user attribute information is encrypted inside the security chip 12 and is registered in this state into the memory unit 14 outside the security chip 12, while the encryption key for encrypting the user attribute information is registered in the security memory unit 12A inside the security chip 12. Since this cellular phone 4 can prevent the encryption key and the encryption algorithm from being stolen or decoded by a third party, it is possible to manage the user attribute information securely. This cellular phone 4 can also reduce the amount of use of the security memory unit 12A as compared to when both the user attribute information and the encryption key are registered in the security memory unit 12A.

If the vein information registered and vein information acquired from a vein image coincide with each other in the security chip 12, the cellular phone 4 decrypts the encrypted user attribute information with the encryption key registered in the security memory unit 12A and presents the resultant to the service provision server $3_x$ (FIG. 4).

The vein information, which only the user himself/herself has, is thus managed by the security memory unit 12A inside the security chip 12 as the key for decrypting the encrypted user attribute information. Since the user attribute information is concealed in two levels with the keys of different perspectives, the cellular phone 4 can further prevent the encryption key and the encryption algorithm from being stolen or decoded by a third party. In addition, the cellular phone 4 can manage the vein information easily and securely as compared to when the vein information is managed by the service provision server $3_x$.

In this embodiment, the cellular phone 4 generates an encryption key unique to the user attribute information by using the encryption key generation unit 32 (FIG. 3), and registers the generated encryption key into the security memory unit 12A in association with the vein information, instead of retaining a single encryption key in the security chip 12. The cellular phone 4 then performs decryption with the encryption key that is associated with the vein information registered in the security memory unit 12A if the vein information registered and vein information to be authenticated, acquired from a vein image, coincide with each other.

Consequently, this cellular phone 4 can manage user attribute information on a plurality of services by means of encryption keys. In addition, the pieces of user attribute information on the services of the plurality of service provision servers $3_1$ to $3_n$ are encrypted with different encryption keys, and are registered in this state into the memory unit 14 outside the security chip 12. Even if any of the encrypted user attribute information happens to be decoded, the cellular phone 4 can prevent the rest of the user attribute information from being decoded based on the result of the decoding.

Moreover, in this embodiment, the encryption key generation unit 32 (FIG. 3) generates an encryption key unique to user attribute information by using all or part of vein information. Since the encryption key is derived from the information that only the user himself/herself has, the confidentiality of the encrypted user attribute information can be improved as compared to when the encryption key is derived from an existing data string.

Furthermore, in this embodiment, the cellular phone 4 does not encrypt the user attribute information itself, but acquires an attribute certificate from the service provision server $3_x$ by using the attribute certificate acquisition unit 22 (FIG. 3) and encrypts this attribute certificate instead. This attribute certificate is the user attribute information to which an user ID authenticated by a third party (public key certificate authority 2) and an identifier for determining the presence or absence of tampering with the user ID and the user attribute information are added.

In order to authenticate the identity of the user and the user attribute information, it is only necessary to subject the user ID and the user attribute information to the verification step where the service provision server $3_x$ determines the presence or absence of tampering by using the identifier. This cellular phone 4 can thus prevent unauthorized reception of services even if the user attribute information registered in the memory unit 14 is stolen or tampered before it is presented to the service provision server $3_x$.

By the way, in another conceivable configuration, the encrypted attribute certificate may be decrypted regardless of whether or not the identity is authenticated by using vein information. Services would then start to be provided on the condition that the identity of the user and the user attribute information are authenticated based on the attribute certificate decrypted, and that a notification comes from the cellular phone 4 that the identity is confirmed by using the vein information.

According to this configuration, the identity can be verified both by the service provision server $3_x$ and by the cellular phone 4. The biological authentication in the cellular phone 4 may lose its significance, however, unless such measures as preventing tampering with the content of notification are taken before the identity verification by the cellular phone 4 is notified to the service provision server $3_x$.

The cellular phone 4, on the contrary, decrypts the encrypted attribute certificate on the condition that the identity is verified by using the vein information, and then presents the attribute certificate decrypted to the service provision server $3_x$. In other words, this cellular phone 4 commits the user identity to the step where the service provision server $3_x$ verifies the attribute certificate, while incorporating the identity confirmation based on the vein information as the key for decrypting the user attribute information encrypted. Since the confirmation of the identity based on the vein information need not be notified to the service provision server $3_x$, the user attribute information can be concealed in two levels with the keys of different perspectives and can be managed accordingly securely without losing the significance of the biological authentication in the cellular phone 4.

Additionally, in this embodiment, the cellular phone 4 updates the association of the encryption key with the vein information and updates the registration of the attribute information in the memory unit 14 by using the update unit 54 (FIG. 5) inside the security chip 12 when the use privilege included in user attribute information is modified. This cellular phone 4 can thus manage the attribute certificate (user attribute information) accurately.

According to the foregoing configuration, attribute information is concealed in two levels inside the security chip 12 by using an encryption key and vein information, and is registered in this state into the memory unit 14 outside the security chip 12. The encryption key and the vein information are retained in the security memory unit 12A inside the security chip 12. This makes it possible to achieve a cellular phone 4 which can manage the attribute information securely while suppressing the amount of memory use inside the block that is under secure control.

(6) Other Embodiments

The foregoing embodiment has dealt with the case where veins are used as the living body. The present invention is not limited thereto, however. Various other types of information on a living body may be applied, including a fingerprint, a mouthprint, an iris, and a face.

The foregoing embodiment may also be practiced by using a subscriber identity module card (SIM), a universal subscriber identity module (UIM), a "Memory Stick (Registered Trademark of Sony Corporation)", and the like as the memory unit 14. The application of SIM or UIM allows the roaming of integrated circuit (IC) chips and the like for improved user convenience.

The foregoing embodiment has dealt with the case of updating the association of the encryption key with the vein information and updating the registration of the attribute information in the memory unit 14 if the use privilege is modified. In another aspect of the present invention, the update may be performed when the attributes of the user, such as name and address, are modified. This allows even more accurate management of the attribute certificates (user attribute information).

The foregoing embodiment has also dealt with the case where the cellular phone 4 is applied. The present invention is not limited thereto, however. Various other types of communication terminals capable of communicating over a network may also be applied, including personal digital assistants (PDA), television sets, and personal computers. In the applications of portable communication apparatuses that have personally-assigned communication IDs such as a telephone number and a mail address, a vein image of the same finger is often input for different services. The present invention can reduce the wasteful use of the security memory unit 12A, and is thus particularly useful.

The present invention is applicable to the field of biometrics authentication.

It should be understood by those skilled in the art that various modifications, combinations, sub-combinations and alterations may occur depending on design requirements and other factors insofar as they are within the scope of the appended claims or the equivalents thereof.

What is claimed is:

1. A service provision system comprising:
    a service provision server; and
    a communication terminal capable of communicating with the service provision server over a network, the communication terminal including:
        a first memory unit arranged outside a block that is under security control, the first memory unit storing encrypted attribute information;
        a second memory unit arranged inside the block, the block having a higher security level than the first memory unit, the second memory unit storing an encryption key and biological information;
        an acquisition unit for acquiring the biological information on a living body from a captured image of a location of the living body, being arranged in the block;
        an encryption unit for encrypting user's attribute information on a service of the service provision server with the encryption key, being arranged in the block;

a registration unit for registering the encrypted attribute information encrypted by the encryption unit into the first memory unit, and registering the biological information and the encryption key into the second memory unit, such that the biological information and encryption key are stored in the block having a higher security level that the first memory unit, the registration unit being arranged in the block; and a decryption unit for decrypting the encrypted attribute information registered in the first memory unit of the communication terminal with the encryption key registered in the second memory unit of the communication terminal if the biological information registered in the second memory unit of the communication terminal and biological information acquired by the acquisition unit of the communication terminal coincide with each other, the decryption unit being arranged in the block; and the service provision server including a provision processing unit for executing processing for providing its own service based on the attribute information decrypted by the decryption unit.

2. A communication terminal capable of communicating with a service provision server over a network comprising:

a first memory unit arranged outside a block that is under security control, the first memory unit storing encrypted attribute information;

a second memory unit arranged inside the block, the block having a higher security level than the first memory unit, the second memory unit storing an encryption key and biological information;

an acquisition unit for acquiring the biological information on a living body from a captured image of a location of the living body, being arranged in the block;

an encryption unit for encrypting the attribute information with the encryption key, being arranged in the block;

a registration unit for registering the encrypted attribute information encrypted by the encryption unit into the first memory unit, and registering the biological information and the encryption key into the second memory unit, such that the biological information and encryption key are stored in the block having a higher security level that the first memory unit, the registration unit being arranged in the block; and a presentation unit for decrypting the encrypted attribute information registered in the first memory unit of the communication terminal with the encryption key registered in the second memory unit of the communication terminal and presenting the attribute information decrypted to the service provision server if the biological information registered in the second memory unit of the communication terminal and biological information acquired by the acquisition unit of the communication terminal coincide with each other, the presentation unit being arranged in the block.

3. The communication terminal according to claim 2, further comprising a certificate acquisition unit for acquiring an attribute certificate generated by the service provision server, the attribute certificate including a user ID authenticated by a third party organization other than a registration apparatus and the service provision server, the attribute information, and an identifier for determining the presence or absence of tampering with the user ID and the attribute information, wherein the encryption unit encrypts the attribute certificate acquired by the certificate acquisition unit with an encryption key generated by a generation unit.

4. The communication terminal according to claim 3, wherein the certificate acquisition unit transmits attribute information input by a user to the service provision server over the network, and acquires an attribute certificate generated by the service provision server, the attribute certificate including the attribute information, the user ID, and the identifier.

5. The communication terminal according to claim 2, wherein:

the attribute information includes a use privilege over the service of the service provision server; and the communication terminal further comprising an update unit for updating association of an encryption key with biological information and updating registration of encrypted attribute information in the first memory unit if the use privilege is modified, the update unit being arranged in the block.

6. The communication terminal according to claim 2, further comprising a generation unit for generating an encryption key unique to the attribute information, being arranged in the block, wherein the encryption unit encrypts the attribute information with the encryption key generated by the generation unit;

the registration unit registers the encryption key into the second memory unit in association with the biological information; and the presentation unit decrypts the encrypted attribute information with the encryption key that is associated with the biological information registered in the second memory unit if the biological information registered and biological information acquired by the acquisition unit coincide with each other.

7. The communication terminal according to claim 6, wherein the generation unit generates the encryption key unique to the attribute information by using the biological information.

\* \* \* \* \*